US009361637B2

(12) United States Patent
Coon et al.

(10) Patent No.: US 9,361,637 B2
(45) Date of Patent: Jun. 7, 2016

(54) SYSTEM AND METHOD FOR PROVIDING DIAGNOSTIC SERVICES

(75) Inventors: Michael Thomas Coon, Crystal Lake, IL (US); Randy L. Menefee, Round Rock, TX (US); David Newman Hutchinson, Oviedo, FL (US); Timothy Ray Adkisson, Chicago, IL (US); Michael J. Kozlowski, Barrington Hills, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 1018 days.

(21) Appl. No.: 12/718,376

(22) Filed: Mar. 5, 2010

(65) Prior Publication Data

US 2011/0218957 A1    Sep. 8, 2011

(51) Int. Cl.
| | |
|---|---|
| *G06Q 10/00* | (2012.01) |
| *G06F 3/048* | (2013.01) |
| *G06F 15/00* | (2006.01) |
| *G06Q 30/00* | (2012.01) |
| *G06N 5/02* | (2006.01) |
| *G06Q 30/06* | (2012.01) |

(52) U.S. Cl.
CPC ............ *G06Q 30/0601* (2013.01); *G06Q 10/00* (2013.01)

(58) Field of Classification Search
None
See application file for complete search history.

(56) References Cited

U.S. PATENT DOCUMENTS

| | | |
|---|---|---|
| 5,715,555 A | 2/1998 | Reber et al. |
| 6,772,096 B2 | 8/2004 | Murakami et al. |
| 6,842,721 B2 | 1/2005 | Kim et al. |
| 6,925,420 B2 | 8/2005 | Ito et al. |
| 7,263,418 B2 * | 8/2007 | Steinmeier et al. .......... 701/31.6 |
| 7,340,414 B2 | 3/2008 | Roh |
| 2002/0095269 A1 | 7/2002 | Natalini et al. |

(Continued)

OTHER PUBLICATIONS

Martha Evens, "Final Report on Languange Understanding and Generation of Complex Tutorial Dialogues", published by: Cognitive Science Program, Office of Naval Research, Arlington, VA, Sep. 30, 2000, pp. 1-28.*

(Continued)

*Primary Examiner* — Kakali Chaki
*Assistant Examiner* — Walter Hanchak
(74) *Attorney, Agent, or Firm* — McAndrews, Held & Malloy, Ltd.

(57) ABSTRACT

A request to diagnose a problem with an appliance is provided to a diagnostic system whereupon the diagnostic system functions to interpret the information indicative of the problem with the appliance to thereby normalize the information indicative of the problem with the appliance. The normalized information indicative of the problem with the appliance is then used to select from a knowledge base in which is maintained a plurality of solutions each having associated tags that function to identify concepts and values in a domain model a set of possible solutions for the problem with the appliance. As necessary, information within the set of possible solutions for the problem with the appliance is used to dynamically generate additional questions to thereby obtain further information indicative of the problem with the appliance. The further information indicative of the problem with the appliance may then be used to identify from with the set of possible solutions for the problem with the appliance a subset of best possible solutions for the problem with the appliance. This subset of best possible solutions for the problem with the appliance may then be presented to an end user to thereby allow the end user to perform the repair(s) needed to correct the problem.

20 Claims, 6 Drawing Sheets

(56) References Cited

U.S. PATENT DOCUMENTS

| | | | |
|---|---|---|---|
| 2003/0100964 A1* | 5/2003 | Kluge et al. | 700/83 |
| 2003/0158640 A1* | 8/2003 | Pillar et al. | 701/33 |
| 2004/0205058 A1* | 10/2004 | Kiji | 707/3 |
| 2005/0102074 A1* | 5/2005 | Kolls | 701/29 |
| 2005/0125083 A1* | 6/2005 | Kiko | 700/19 |
| 2007/0129812 A1* | 6/2007 | Ferchau | G05B 19/0428 700/1 |
| 2008/0157936 A1* | 7/2008 | Ebrom et al. | 340/286.02 |
| 2008/0177438 A1* | 7/2008 | Chen et al. | 701/33 |
| 2008/0313007 A1 | 12/2008 | Callahan et al. | |
| 2009/0006476 A1* | 1/2009 | Andreasen et al. | 707/104.1 |
| 2009/0055164 A1* | 2/2009 | Hu et al. | 704/9 |
| 2009/0083000 A1* | 3/2009 | Sherman et al. | 702/184 |
| 2009/0100132 A1 | 4/2009 | Ebrom et al. | |

OTHER PUBLICATIONS

Chia-Hsun Jackie Lee, Leonardo Bonanni, Jose H. Espinosa, Henry Lieberman, Ted Selker, "Augmenting Kitchen Appliances with a Shared Context using Knowledge about Daily Events", Proceedings of the 2006 International Conference on Intelligent User Interfaces, Sydney, Australia. ACM, , Jan. 29-Feb. 1, 2006, pp. 348-350.*

Michael F. McTear, Spoken Dialogue Technology: Enabling the Conversational User Interface, ACM Computing Surveys (CSUR) Surveys archive, vol. 34, Issue 1, Mar. 2002, pp. 90-169.*

Nuance Recognizer staff, "Nuance Recognizer 9.0 Advanced NLU Developer's Guide", Nuance Communications, Inc. One Wayside Road, Burlington, Massachusetts, Sep. 20, 2007, pp. 1-120.*

Martin Hepp: Products and Services Ontologies: A Methodology for Deriving OWL Ontologies from Industrial Categorization Standards, Int'l Journal on Semantic Web & Information Systems (IJSWIS), vol. 2, No. 1, Jan.-Mar. 2006, pp. 72-99.*

Abraham Bernstein and Esther Kaufmann, "GINO—A Guided Input Natural Language Ontology Editor", proceedings of ISWC 2006, 5th International Semantic Web Converence, Athens, GA, USA, Nov. 5, 2006, copyright Springer-Verlag, Berlin, Heidelberg, 2006, pp. 144-157.*

Canadian Office Action for Appln. No. 2,714,804 dated Jun. 14, 2013.

* cited by examiner

| FUNCTIONS | FEATURES | TECHNOLOGY |
|---|---|---|
| INTERACT (UI) | • MULTIPLE SEARCH MODES<br>• SUPPORTS NOVICE TO EXPERT USERS<br>• MULTIPLE LANGUAGES<br>• ROLE BASED ACCESS / AUTHORING | USER INTERFACE |
| INTERPRET | • NORMALIZED STRUCTURE<br>• SYNONYMS / ACRONYMS<br>• MISSPELLINGS<br>• CLARIFYING QUESTIONS | DOMAIN MODEL |
| RETRIEVE & REFINE | • SIMILARITY BASED RETRIEVAL<br>• DYNAMIC QUESTIONING<br>• CONSISTENT RESPONSES<br>• SPEED AND ACCURACY OF RETRIEVAL | CBR & DI |
| MANAGE | • SINGLE KNOWLEDGE BASE<br>• TOOLS TO BUILD THE KNOWLEDGE BASE<br>• AUTHORING WORKFLOWS<br>• REPORTING AND ANALYTICS | KNOWLEDGE BASE |

FIG. 5

☐ SOLUTION

TITLE: CLOTHING WRAPPED AROUND AGITATOR DUE TO OVERLOADING.

CORE ISSUE: WHEN THE WASHER IS OVERLOADED OR TIGHTLY PACKED, THE AGITATOR CANNOT MOVE FREELY AND CAN CAUSE CLOTHING TO WRAP AROUND IT.

RESOLUTION: LOOSELY LOAD CLOTHING TO THE TOP OF THE BASKET WHILE CHOOSING AN APPROPRIATE WATER LEVEL. DO NOT TIGHTLY PACK OR STUFF CLOTHING INTO THE TUB.

☐ PRODUCT

APPLIANCE: WASHER

APPLIANCE TYPE: TOP LOAD

COMPONENT: AGITATOR

☐ REQUEST TOPIC: TROUBLESHOOTING

☐ PROBLEM

OPERATING ISSUES: CYCLE NOT STARTING

CYCLE: WASH CYCLES, AGITATION

LAUNDRY ISSUES: DAMAGED LAUNDRY, TANGLED/TWISTED LAUNDRY

FIG. 6

SYSTEM AND METHOD FOR PROVIDING DIAGNOSTIC SERVICES

BACKGROUND

Systems and methods for monitoring and servicing appliances are generally known in the art. For example, U.S. Publication No. 2002/00952269 to Natalini, published on Jul. 18, 2002, describes an appliance monitoring system for use with household appliances that includes subsystems for continuously monitoring the operations of one or more appliances and a gateway through which the subsystems communicate with a remote service center that oversees the servicing of the appliances. The subsystem associated with a particular appliance tracks various operating parameters and conditions, such as the total number, type, times, and duration of operating cycles; energy consumption during the cycles; and/or the states of various components such as intake valves, doors, sensors, and so forth, during the operating cycles. The subsystem then analyses the monitored information to determine if the appliance is malfunctioning and/or requires immediate or other attention. If so, the subsystem sends the monitored data and the results of the analysis in the form of an alarm or a warning message to the remote service center to inform the remote service center that the appliance is in need of attention. The remote service center responds to a received alarm or warning condition based on the particular fault or condition and also on a level-of-service contract with the user. For example, if a particular fault or condition is user-correctable, the remote service center may contact the user to correct the particular fault or condition. If the condition requires emergency or non-emergency technician service, the remote service center may arrange for technician service in accordance with any provisions of the level-of-service contract.

By way of still further example, U.S. Pat. No. 6,925,420 to Ito, issued on Aug. 2, 2005, describes a service system for an air conditioner. The service system includes a monitoring center which has a customer database, an operational information database for storing operational information of air conditioners for each customer, and a device information database having device information on the air conditioners related with each customer of the customer database. The monitoring center, upon deciding that there is an anomaly in the operational information of a monitored air conditioner, functions to download to a cellular phone of a service technician, over the Internet, information that serves to describe the anomaly, the customer information, and information for correcting the anomaly.

Yet further, U.S. Pat. No. 6,772,096 to Murkami, issued on Aug. 3, 2004, describes a remote maintenance system in which a service center server, located in a service center, is in communication with a home server, located in a house. The service center server functions to perform maintenance of an appliance and the home server functions to monitor a status of an appliance. More particularly, the home server includes an appliance management unit that acquires a status value of the appliance, a communication unit that receives from the service center server a failure model, which is information defining a method of deriving a decision as to whether the appliance has failed or not from the status value, and a failure deciding unit that decides whether the appliance has failed or not based on the acquired status value and the received failure model using qualitative reasoning. The service center server also includes a failure model updating unit that updates a failure model and sends the updated failure model to the home server via a communication unit.

Still further, U.S. Publication No. 2008/0313007 to Callahan, published on Dec. 18, 2008, describes a system for scheduling an in-home appliance repair service. The system receives input from a user via a client device. The input is used to identify one or more home appliances in need of repair. Data identifying the appliance is then transmitted to a repair scheduling server. The repair scheduling server executes a program which determines a plurality of available repair time slots and transmits a list of choices to the client device for display. The available repair time slots may depend on the type of appliance, the brand of the appliance, the particular model, the user's identity, and/or the geographical location of the appliance. Preferably, time slots are dynamically determined in cooperation with a plurality of service providers. Once the user selects a timeslot, the service is confirmed and scheduled.

Additional publications, such as U.S. Pat. No. 7,340,414 to Roh, issued on Mar. 4, 2008, U.S. Publication No. 2009/0100132 to Ebrom, published on Apr. 16, 2009, U.S. Pat. No. 6,842,721 to Kim, issued on Jan. 11, 2005, and U.S. Pat. No. 5,715,555 to Reber, issued on Feb. 10, 1998, also describe systems that use sensors to monitor and report various conditions that are associated with an appliance.

While the systems and methods described in these exemplary publications, which are incorporated herein by reference in their entirety, generally work for their intended purpose, the subject invention provides improvements thereto which improvements will become apparent from the descriptions that follow.

SUMMARY OF THE INVENTION

The following describes an improved system and method for providing diagnostic services. To this end, in response to a user, e.g., a customer, customer service representative, service technician, or the like, providing to the system a request to diagnose a problem with an appliance, where the request includes information indicative of the problem with the appliance, the system functions to interpret the information indicative of the problem with the appliance to thereby normalize the information indicative of the problem with the appliance; use the normalized information indicative of the problem with the appliance to select from a knowledge base in which is maintained a plurality of solutions each having associated tags that function to identify concepts and values in a domain model a set of possible solutions for the problem with the appliance; use information within the set of possible solutions for the problem with the appliance to dynamically generate additional questions to thereby obtain further information indicative of the problem with the appliance; and use the further information indicative of the problem with the appliance to identify from with the set of possible solutions for the problem with the appliance a subset of possible solutions for the problem with the appliance. This subset of possible solutions for the problem with the appliance may then be presented to the user to thereby allow the user to perform the repair(s) needed to correct the problem.

While the forgoing provides a general overview of some of the various features and functionalities of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which:

FIG. 5 illustrates exemplary functions and features associated with the various technologies utilized in connection with the provision of diagnostic services; and FIG. 6 illustrates an exemplary solution provided in response to a request seeking diagnostic assistance.

DETAILED DESCRIPTION

Figure 1:
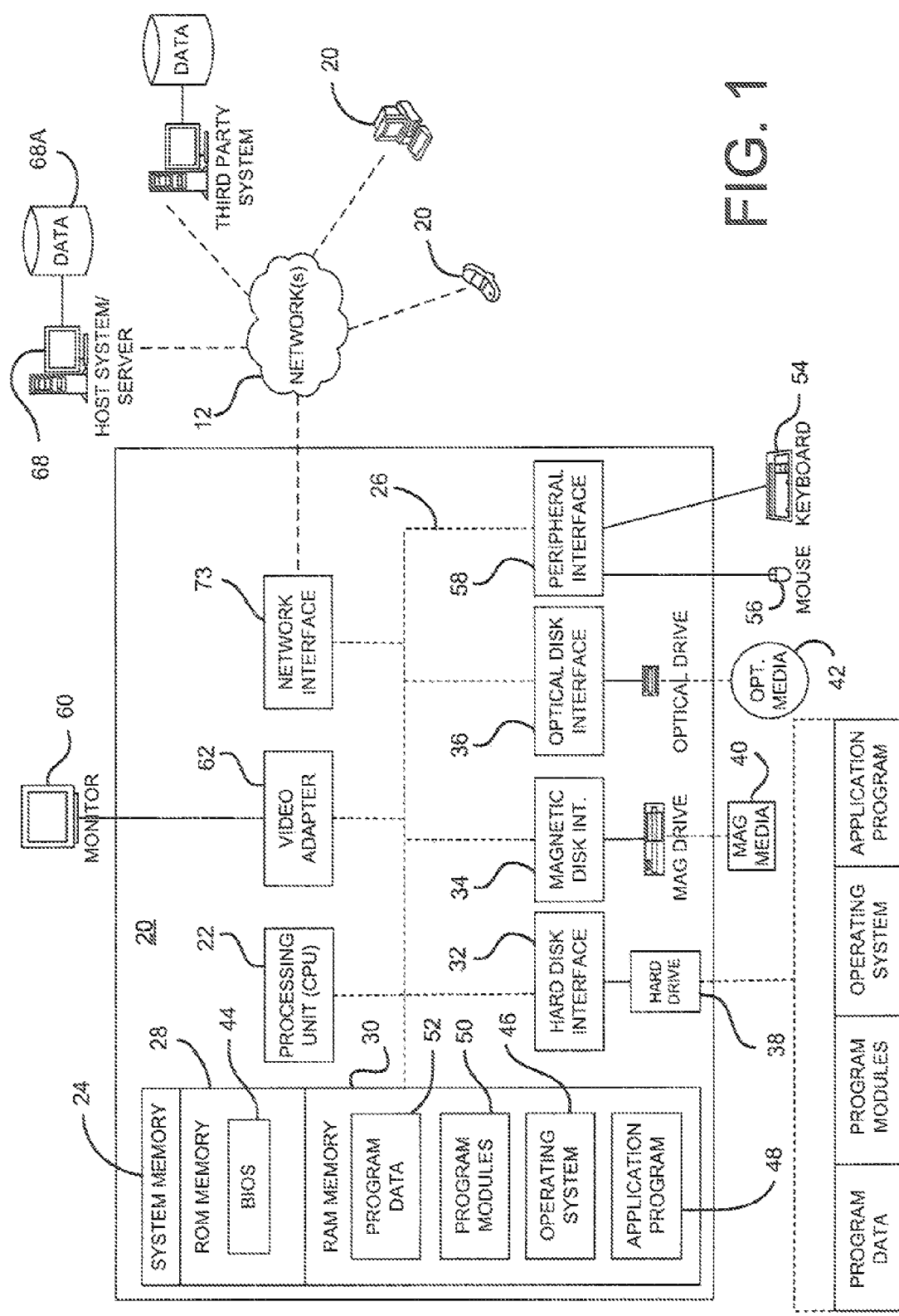
FIG. 1 illustrates in block diagram form components of an exemplary computer network environment utilized to provide diagnostic services.

Turning first to FIG. 1, a processing device 20, illustrated in the exemplary form of a computer, is provided with executable instructions stored on computer-readable media to, for example, offer a means by which a user, e.g., a consumer, a customer service representative, a service technician, etc., may access a service center server 68 and, among other things, provide to the service center server 68 information indicative of an appliance related problem and to receive from the service center server 68 (and/or related servers) information for repairing/servicing the appliance in accordance with a diagnosis of the appliance related problem as obtained from an analysis of the user provided information. Generally, the computer executable instructions reside in program modules which may include routines, programs, objects, components, data structures, etc. that perform particular tasks or implement particular abstract data types. Accordingly, the processing device 20 may be embodied in any type of device having the ability to execute instructions such as, by way of example, a personal computer, mainframe computer, personal-digital assistant ("PDA"), cellular telephone, tablet device, or the like. Furthermore, while described and illustrated in the context of a single processing device 20, it will be appreciated that the various tasks described hereinafter may be practiced in a distributed environment having multiple processing devices linked via a local or wide-area network, such as the Internet, whereby the executable instructions may be associated with and/or executed by one or more of the multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser, pdf viewer, flash/media player, etc.), other program modules 50, and/or program data 52. Still further, computer-executable instructions may be downloaded to one or more of the computing devices as needed, for example via a network connection.

To allow a user to enter commands and information into the processing device 20, input devices such as a touch pad or keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As noted, the processing device 20 may also utilize logical connections to one or more remote processing devices, such as the service center server 68 having associated data repository 68A. While the service center server 68 has also been illustrated in the exemplary form of a computer, it will be appreciated that the service center server 68 may, like processing device 20, be implemented using any type of device having processing capabilities. It will again be similarly appreciated that the service center server 68 need not be implemented as a single device but may be implemented in a manner such that the tasks performed by the service center server 68 are distributed amongst a plurality of processing devices/databases, located at the same or different geographical locations, that are linked through a communication network. Additionally, the service center server 68 may have logical connections to other third party systems via the network 12 and, via such connections, will be associated with data repositories that are associated with such other third party systems. Such third party systems may include, without limitation, systems of service technicians, systems of manufacturers of appliances, systems of third party providers of repair parts, systems of shipping/delivery companies, etc.

For performing tasks as needed, the service center server 68 may include many or all of the elements described above relative to the processing device 20. In addition, the service center server 68 includes executable instructions for, among other things, receiving from processing devices 20 information indicative of an appliance related problem, for using the received information to diagnose one or more problems associated with the appliance, and to provide to processing devices 20 information for repairing/servicing the appliance in accordance with the diagnosis of the appliance related problem(s) as obtained from the analysis of the user provided information. The service center server 68 may also include executable instructions for managing technician repair/servicing of an appliance by, for example, directing/scheduling service technicians to the customer's location, ordering/reserving/tracking repair parts, obtaining appliance related information from manufacturers, managing payment for repair services/parts, etc., utilizing logical connections to third party systems as necessary.

Communications between the processing device 20 and the service center system server 68 may be exchanged via a further processing device, such as a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) associated with the service center server 68.

Figure 2:
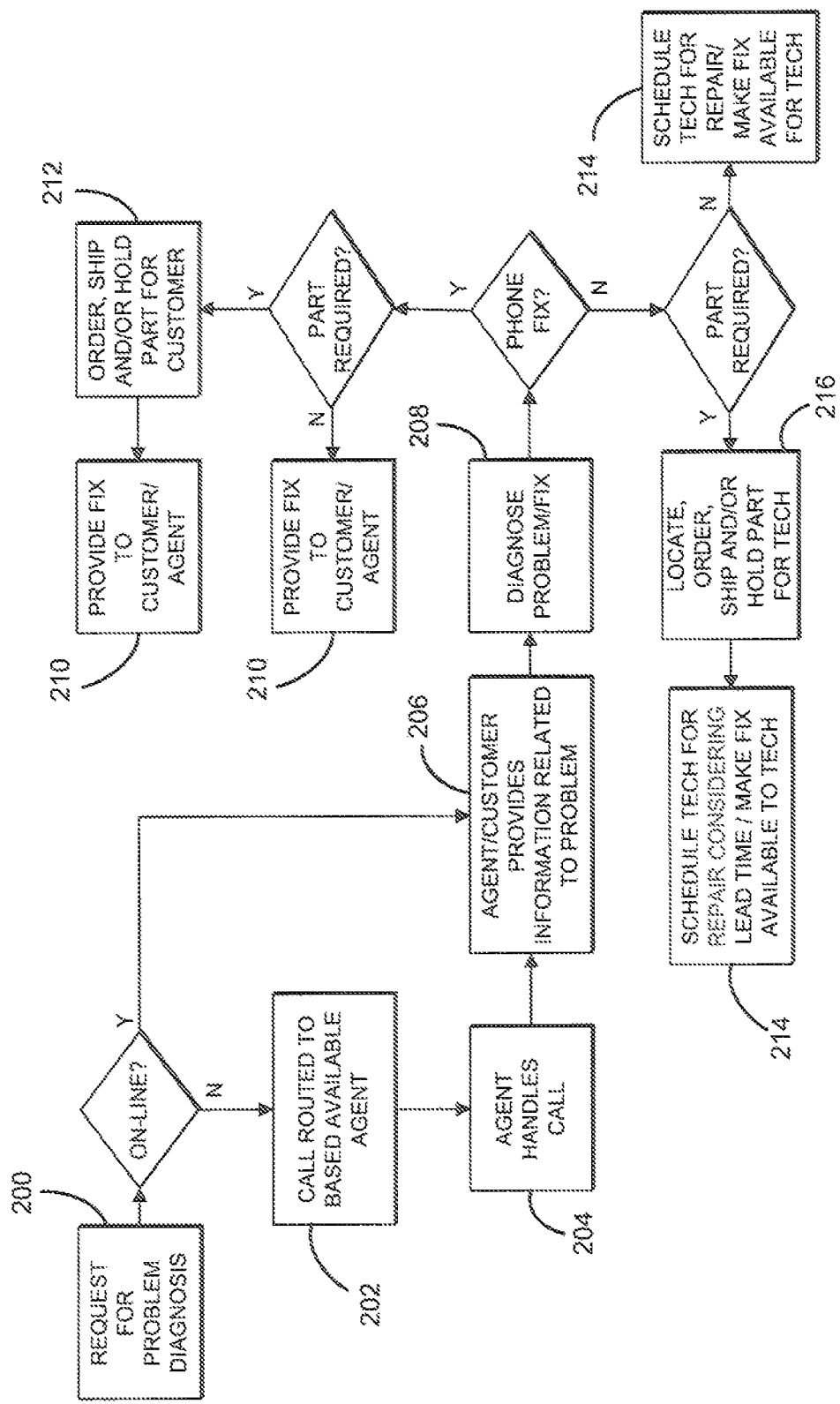
FIG. 2 illustrates in flow chart form exemplary steps performed by the system to provide diagnostic services.

As noted above, the subject invention provides a means for diagnosing a problem with an appliance and for providing information, obtaining repair parts, and/or scheduling services to repair such problem. To this end, as generally illustrated in FIG. 2, the process begins with when a consumer requests 200 diagnosis of a problem associated with an appliance. Information pertaining to the appliance related problem may be provided to the system, i.e., the service center server 68, directly by the consumer 206, for example via interaction with a service center web page displayed on a consumer computer 20, or by the consumer relaying information pertaining to the appliance related problem to a customer service representative 202/204, e.g., via phone, whereupon the information pertaining to the appliance related problem is provided to the system by the customer service representative 206, for example via interaction with a service center web page displayed on a customer service representative computer 20. When the information pertaining to the appliance related problem is received at the service center server 68, the service center server 68 will analyze the data using diagnostic software to diagnose the problem with the appliance (if any) and may further make available information for repairing/servicing the appliance in accordance with the diagnosis of the appliance related problem as obtained from the analysis of the user provided information 208. In this regard, the system may determine that the problem with the appliance is one that can be fixed by the customer 210 and, as such, may simply provide the customer with the information that is needed to make this repair (e.g., via a service center web page viewable on customer computer 20 or as relayed to the customer by a customer service representative viewing such information on their customer service computer 20). In the event that the system determines that the problem can be fixed by the customer but repair part(s) are also required, the system may also facilitate 212 the ordering/shipping of the repair part to the customer, payment for the repair part, placing the repair part on hold for the customer for pickup, etc. without limitation. Such actions may, as noted previously, utilize communications with third party systems as required.

In the event that the system determines that the diagnosed problem with the appliance is best fixed by a service technician, this determination would be relayed to the customer and the system may, with the permission of the customer, further facilitate such technician service repair 214. Furthermore, if the system determines that repair part(s) are needed to perform repair of the appliance, the system may function to locate 216 such repair parts (e.g., determine if parts are currently on a dispatched service truck, at a location near a dispatched service truck, at a location that requires shipment of the part to the customer or technician, etc.) and consider the location of such repair parts when coordinating/scheduling a service call with the customer. For scheduling a service call with the customer and/or for locating repair parts if needed, the system may again communicate with third party systems as required, e.g., to obtain near real-time technician locations and schedules, etc. The system may also make available to the service technician any information 214 that would be needed to perform the repair. Such information may be directly downloaded to a technician computer 20 and/or be otherwise, later accessed by a technician from a computer 20 as needed.

Figure 3:
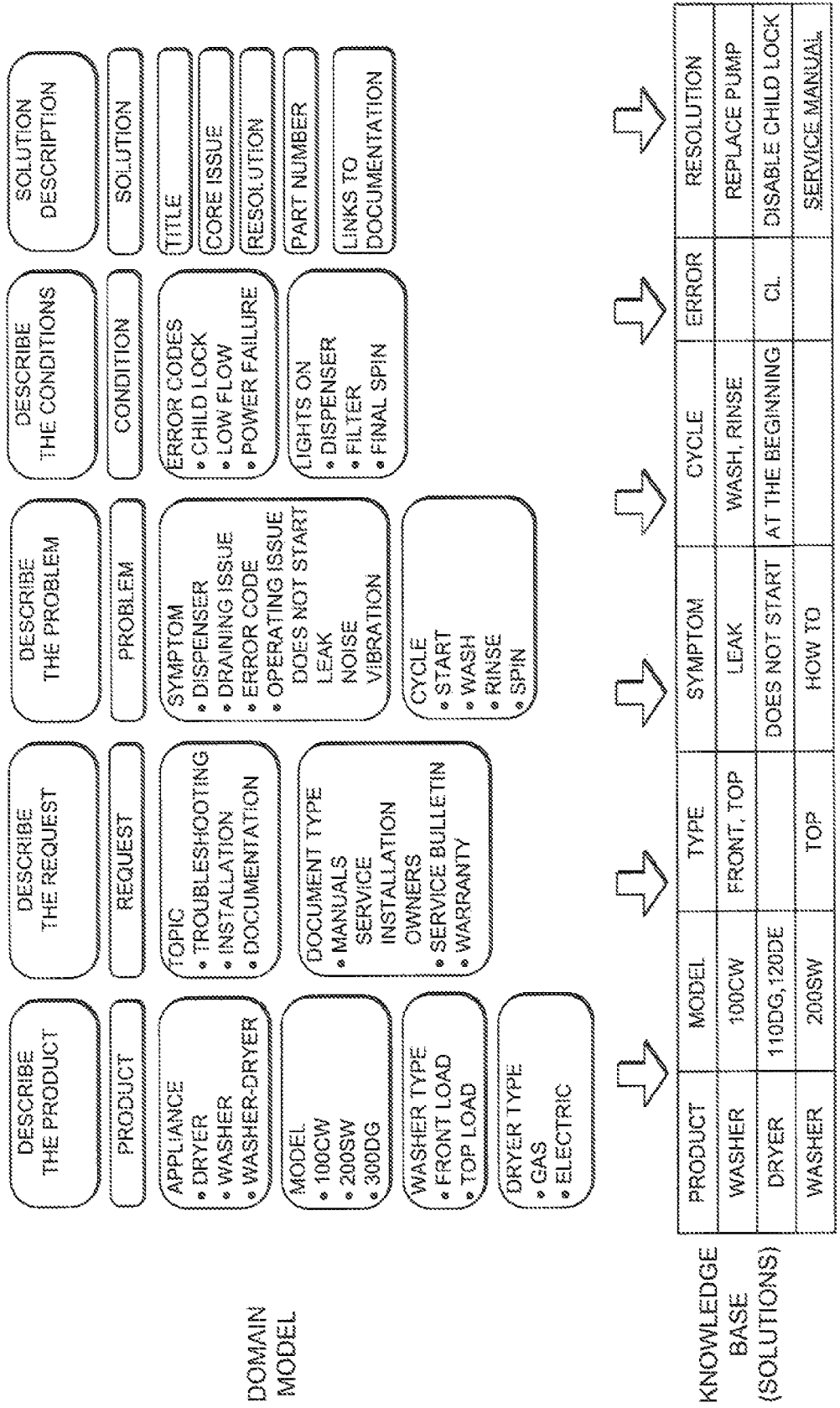
FIG. 3 illustrates an exemplary domain model used by the system to identify solutions in a knowledge base related to the provision of diagnostic services.
Figure 4:
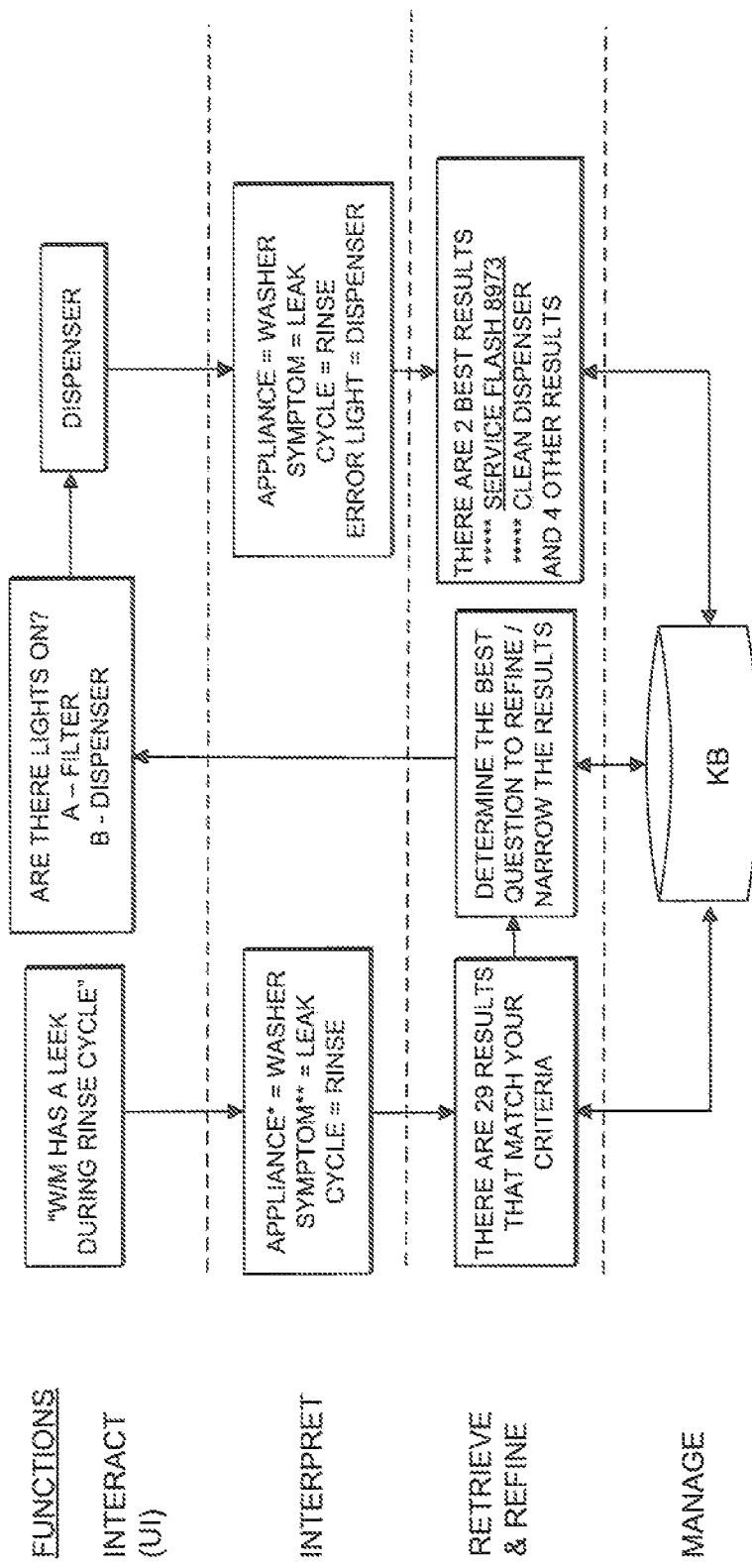
FIG. 4 illustrates an example by which solutions in the knowledge base of FIG. 3 are identified in response to a request seeking diagnostic assistance.

Turning now to FIGS. 3-5, for diagnosing a problem with an appliance considering the information that is provided, a knowledge management application architecture, such as provided by Kaidara Software, is preferably utilized by the service center server 68. More particularly, the architecture associated with the knowledge management application allows the consumer to request diagnosis of an appliance problem by first providing information that functions to describe the appliance (e.g., by appliance type, by model number, by appliance feature, etc.), describe the nature/symptom(s) of the problem, and/or describe condition(s) associated with the problem, (e.g., specify error codes provided by the appliance, etc.) Such information may be provided to the system through use of free form text entry, through use of a guided search, through use of browse search, etc. without limitation.

After the system receives the information pertaining to the appliance problem from the customer, the system then functions to use a predefined ontology to interpret, as necessary, the information so provided as is particularly illustrated in FIGS. 4 and 5. When interpreting the customer provided information the system generally functions to normalize the information into predefined domain attributes, e.g., by correcting misspellings, substituting language, etc., whereupon the predefined domain attributes may be used by the system to identify appropriate, possible solution(s) to the problem from a plurality of solutions maintained in a knowledge base of solutions, e.g., in data repository 68A. In this regard, it is to be understood that the solutions maintained in the knowledge base of solutions are assigned tags which function to identify concepts and/or values from the domain model such that the normalized problem related information can be matched to one or more particular solution cases. By way of example, the tags provided to solutions in the knowledge base typically function to identify symptoms of a problem, how a problem manifests itself, or the like.

In the event that the normalized query leads the system to identify multiple, possible solutions for a particular appliance related problem, the system may then function to dynamically generate additional questions to pose to the customer to thereby gather further information for use in narrowing down the multiple, possible solutions to one or more best solution. The questions may, for example, be posed such that the consumer will ultimately be forced to provide an answer that has a domain value that corresponds to a tag which is unique to a subset of solutions within the originally identified set of possible solutions. By way of example only, FIG. 4 illustrates the system dynamically forming a question which requests the customer to identify if the warning light is for the filter or the dispenser whereupon, with the user identifying the dispenser, a narrower subset of the originally identified possible solutions to the diagnosed problem are presented. As discussed above, in connection with identifying a possible solution to the diagnosed problem with an appliance, the system may also utilize information maintained with the knowledge base (and/or in other systems) to facilitate a correction of the problem.

Considering now FIG. 6, the solution that is presented to the customer (or customer service representative or technician) generally includes a title whereby a user can easily scan solutions (in the event more than one is identified) to identify a particular one that best fits the problem they are experiencing. The solution also includes a core issue field whereby a novice user of the system may match their symptoms to the solution case symptoms to thereby determine if the particular solution is relevant to their needs. The solution also provides written instructions for resolving the problem. The solution may additionally provide pictures, links to further information (such as repair movies, reference manuals, schematic diagrams, or the like), etc. In the example illustrated in FIG. 6, also shown are the various domain tags that were pre-associated with the presented solution which may or may not be presented to the user as desired.

While various concepts have been described in detail, it will be appreciated by those skilled in the art that various modifications and alternatives to those concepts could be developed in light of the overall teachings of the disclosure. For example, while various aspects of the invention have been described in the context of functional modules, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person knowledgeable in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transitory computer-readable media embodied on a physical device having computer-executable instructions for providing appliance-related, diagnostic services, the instructions performing steps comprising: receiving a free-form text request from a user interface to diagnose a problem with an appliance, the request including information indicative of the problem with the appliance; interpreting the information indicative of the problem with the appliance to normalize the information indicative of the problem with the appliance, wherein the interpretation of the information includes replacing a word in the request with a second word and then normalizing the information including the second word into predefined domain attributes; using the normalized information to select from a knowledge base in which is maintained a plurality of solutions, each solution having associated tags that function to identify concepts and values from a domain model so that the normalized information can be matched to a set of possible solutions for the problem with the appliance, wherein the tags identify at least a symptom of the problem and how the problem manifests itself; using information within the set of possible solutions for the problem with the appliance to generate additional questions to obtain further information indicative of the problem with the appliance, wherein the additional questions are posed such that the user provides an answer that has a domain value that corresponds to a tag that is associated with a subset of solutions within an initial set of possible solutions; using the further information to identify a subset of possible solutions for the problem with the appliance from within the initial set of possible solutions; and presenting the subset of possible solutions for the problem with the appliance and the tags associated with the subset to a user.

2. The non-transitory computer-readable media as recited in claim 1, wherein the request is provided from a user computing device in communication with a service center server having the computer-readable media.

3. The non-transitory computer-readable media as recited in claim 2, wherein the computing device communicates with the service center server via an Internet connection.

4. The non-transitory computer-readable media as recited in claim 1, wherein at least one solution for the problem with the appliance within the subset of possible solutions for the problem comprises a link to additional information related to the problem with the appliance.

5. The non-transitory computer-readable media as recited in claim 4, wherein the additional information comprises a schematic diagram of the appliance.

6. The non-transitory computer-readable media as recited in claim 4, wherein the additional information comprises a user's manual for the appliance.

7. The non-transitory computer-readable media as recited in claim 4, wherein the additional information comprises a move demonstrating a repair procedure for the appliance.

8. The non-transitory computer-readable media as recited in claim 1, wherein at least one solution for the problem with the appliance within the subset of possible solutions for the problem comprises a title that functions to identify a problem to which the solution pertains.

9. The non-transitory computer-readable media as recited in claim 8, wherein at least one solution for the problem with the appliance within the subset of possible solutions for the problem comprises a core issues field the functions to identify symptoms of the problem to which the solution pertains.

10. The non-transitory computer-readable media as recited in claim 1, wherein the instructions function to order a repair part needed to repair the appliance for delivery to a location having the appliance.

11. The non-transitory computer-readable media as recited in claim 1, wherein the instructions function to schedule a service technician to repair the appliance.

12. The non-transitory computer-readable media as recited in claim 11, wherein the instructions function to locate a repair part needed to repair the appliance and schedule the service technician to repair the appliance considering the location of the repair part.

13. The non-transitory computer-readable media as recited in claim 1, wherein the instructions function to place a repair part needed to repair the appliance on hold for pickup at a retail location.

14. The non-transitory computer-readable media as recited in claim 1, wherein the interpreting step includes replacing text in the request with an acronym or a synonym of the text.

15. The non-transitory computer-readable media as recited in claim 1, wherein the interpreting step includes replacing misspelled text in the request with text with a proper spelling.

16. The non-transitory computer-readable media as recited in claim 1, wherein the interpreting step includes substituting language in the request with other language.

17. The non-transitory computer-readable media as recited in claim 1, wherein the generation of additional questions includes determining a best question to ask to narrow the set of possible solutions for the problem with the appliance.

18. The non-transitory computer-readable media as recited in claim 1, wherein the interpreting step includes generating problem parameters from a free form text description of the problem input by the user as part of the request and associating the obtained problem parameters with predefined categories used to retrieve possible solutions.

19. The non-transitory computer-readable media as recited in claim 1, wherein the associated tags function to identify symptoms of the problem and how the problem manifests itself.

20. The non-transitory computer-readable media as recited in claim 1, wherein the request to diagnose the problem with the appliance is received from a user interface that is configured to provide role-based access and authoring.

\* \* \* \* \*